United States Patent [19]

Fuhrman

[11] 4,175,287

[45] Nov. 20, 1979

[54] ELASTIC STORE SLIP CONTROL CIRCUIT APPARATUS AND METHOD FOR PREVENTING OVERLAPPING SEQUENTIAL READ AND WRITE OPERATIONS

[75] Inventor: James L. Fuhrman, Cedar Rapids, Iowa

[73] Assignee: Rockwell International Corporation, El Segundo, Calif.

[21] Appl. No.: 871,575

[22] Filed: Jan. 23, 1978

[51] Int. Cl.[2] .................. G06F 11/00; G06F 13/00
[52] U.S. Cl. .............................. 364/900; 235/92 DP; 235/312
[58] Field of Search ... 364/900 MS File, 200 MS File; 235/92 DP, 92 SH, 312; 178/69.1; 307/269; 360/26

[56] References Cited

U.S. PATENT DOCUMENTS

| | | | |
|---|---|---|---|
| 3,818,461 | 6/1974 | Ward et al. | 364/900 |
| 3,851,335 | 11/1974 | Elliott | 360/26 |
| 3,867,579 | 2/1975 | Colton et al. | 364/900 |
| 3,887,769 | 6/1975 | Cichetti, Jr. et al. | 178/69.1 |
| 3,941,982 | 3/1976 | Knollenberg et al. | 235/92 DP |
| 3,992,699 | 11/1976 | Krumbach | 364/900 |
| 4,040,027 | 8/1977 | Ven Es et al. | 364/900 |
| 4,051,353 | 9/1977 | Lee | 364/900 X |
| 4,054,747 | 10/1977 | Pachynski, Jr. | 178/69.1 |
| 4,054,949 | 10/1977 | Takezoe | 364/900 |
| 4,056,851 | 11/1977 | Hovagimyan et al. | 364/900 |

*Primary Examiner*—Melvin B. Chapnick
*Attorney, Agent, or Firm*—Bruce C. Lutz; Howard R. Greenberg; H. Fredrick Hamann

[57] ABSTRACT

The method of and circuitry for controlling the "slip" of data between input and output of a multisection memory circuit wherein the memory is used in an elastic store mode. This is accomplished by, in essence, comparing the counts of write and read counters operating with a multisection memory of at least four sections, and if the counts are too close together, such that both read and write operations could occur in the same section after advancement, then the advancing counter is not enabled for further count advancement.

4 Claims, 3 Drawing Figures

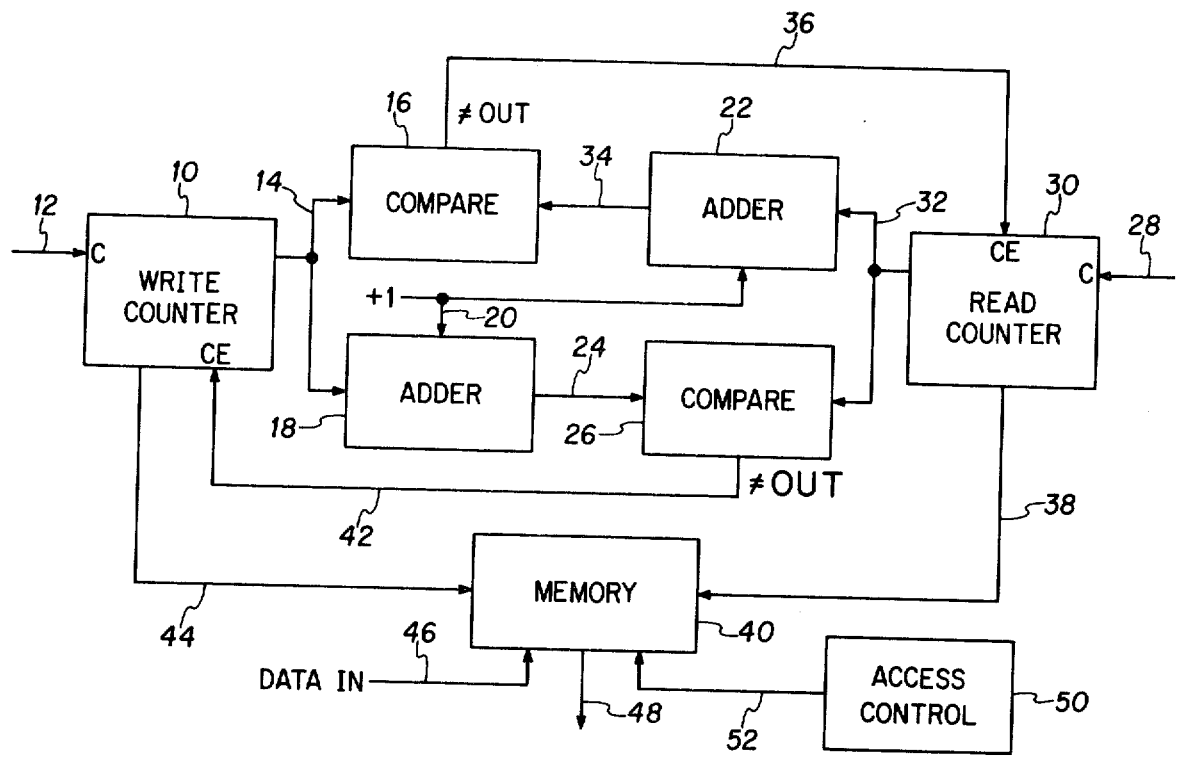
FIG. 1
| | | | LEADS | | |
|---|---|---|---|---|---|
| 62 RDS2 | 64 RDS1 | 70 WRS2 | 68 WRS1 | 82 WOUT | 86 ROUT |
| 0 | 0 | 0 | 0 | 1 | 1 |
| 0 | 0 | 0 | 1 | 1 | 0 |
| 0 | 0 | 1 | 0 | 1 | 1 |
| 0 | 0 | 1 | 1 | 0 | 1 |
| 0 | 1 | 0 | 0 | 1 | 1 |
| 0 | 1 | 0 | 1 | 1 | 1 |
| 0 | 1 | 1 | 0 | 1 | 0 |
| 0 | 1 | 1 | 1 | 0 | 1 |
| 1 | 0 | 0 | 0 | 1 | 1 |
| 1 | 0 | 0 | 1 | 0 | 1 |
| 1 | 0 | 1 | 0 | 1 | 1 |
| 1 | 0 | 1 | 1 | 1 | 0 |
| 1 | 1 | 0 | 0 | 0 | 1 |
| 1 | 1 | 0 | 1 | 1 | 1 |
| 1 | 1 | 1 | 0 | 1 | 1 |
| 1 | 1 | 1 | 1 | 1 | 1 |
FIG. 3
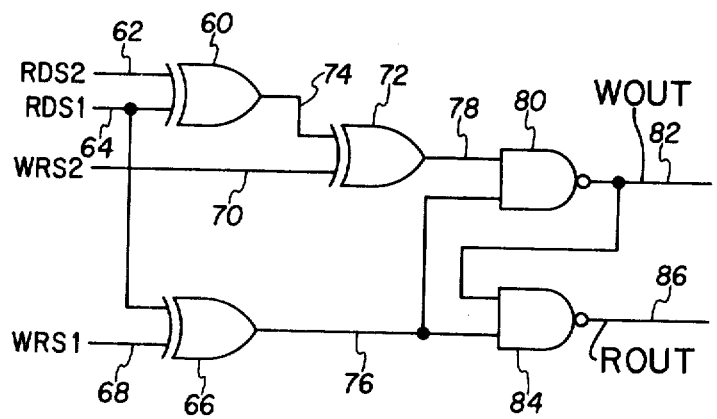
FIG. 2

ELASTIC STORE SLIP CONTROL CIRCUIT APPARATUS AND METHOD FOR PREVENTING OVERLAPPING SEQUENTIAL READ AND WRITE OPERATIONS

THE INVENTION

This invention is directed generally to electronics and more specifically to a circuit for logically comparing two counts and providing prescribed outputs only when the counts differ from one another by more than a predetermined amount.

The prior art relating to circuits for use with elastic store apparatus and for correcting for underflow or overflow conditions is quite expensive. However, most of the prior art has related to the use of shift registers as an elastic store apparatus. Only recently has the idea of using a memory device as an elastic store apparatus come into being. With the use of a new medium of delay or storage has come new solutions, one of which is illustrated herein.

In the present invention, data is written into memory in sequential order as it occurs and it is read out of memory in the same sequential order. In one embodiment of the invention, the memory was divided into four sections and it was considered desirable, in order to prevent read and write operations from overlapping, to keep the read and write operations in separate sections or sectors. Thus, two counters are used, one of which correlated with the section of write operations and the other of which correlated with the section of read operations, and the counts in these two counters are compared. If the read count plus one equals the write count, the read counter is not enabled to prevent the device from advancing to the section in which write operations are occurring. Likewise, if the write count plus one equals the read count, the write operations are not allowed to advance to the section of the read operations. While this does provide a discontinuity in the data being read out, a single very seldom occurring discontinuity is preferable to the ongoing set of discontinuities which would occur if read and write operations took place in the same memory cells. This continuing set of discontinuities would occur because the read and write counts are extremely close to the same frequency and on occasion do vary so that the clock frequency of one of the read and write operations can vary up and down with respect to the other clock frequency and thus cause a set of discontinuities occurring over a long term.

It is, therefore, an object of the present invention to provide an improved slip control circuit for use in conjunction with elastic store operations.

Other objects and advantages of the present invention may be ascertained from a reading of the specification and appended claims in conjunction with the drawings wherein:

FIG. 1 is a symbolic block diagram of the essence of operation of the present invention;

FIG. 2 is a detailed schematic diagram of the electronic circuitry used to provide the compare, add and enable functions of FIG. 1 for one embodiment of the invention; and FIG. 3 is a truth table of logic values used in explaining the operation of FIG. 2.

DETAILED DESCRIPTION

In FIG. 1, a write counter 10 receives clock incrementing signals on a lead 12 and provides output signals on a lead 14. Lead 14 is applied both to a compare circuit 16 and to an adder circuit 18. A lead 20 supplies a logic one to adder 18 as well as to an adder circuit 22. This logic one acts to effectively add a numerical "1" to the number supplied to 18 on lead 14 before outputting this number on lead 24 to compare circuit 26. A read clock incrementing signal is supplied on a lead 28 to a read counter 30 which provides output signals on a lead 32 to the compare circuit 26 as well as to adder circuit 22. Adder circuit 22 adds the number on lead 32 to the logic one of lead 20 and provides the sum on a lead 34 to compare circuit 16. As long as the numbers applied on leads 14 and 34 are not equal, a logic one is supplied on a lead 36 to a Count Enable input of counter 30 so as to provide a new count output on a lead 38 to a memory circuit 40 with each clock appearing on lead 28. In a similar manner, compare circuit 26 provides a logic one output on a lead 42 to the Count Enable input of write counter 10 if the numerical counts input on leads 24 and 32 are not equal. When the logic one is applied to the Count Enable input of counter 10, each succeeding input on lead 12 increments the output count on a lead 44 so as to provide a new position in memory 40 for data incoming on a lead 46 thereto. The memory outputs data on a lead 48 from memory cells defined by the count signals appearing on lead 38. The memory 40 is under the control of an access control device 50 which inputs signals on a lead 52 to determine whether read or write operations will occur.

In FIG. 2, an exclusive OR gate 60 receives input signals on leads 62 and 64. Lead 62 supplies signals indicative of a most significant bit (MSB) position of a read counter such as 30 in FIG. 1 while lead 64 is indicative of the signals in the next most significant bit (NMSB) position of the counter. Lead 64 is also connected to an exclusive OR gate 66 which additionally receives signals on a lead 68 from WRS1 and is similarily indicative of signals in the NMSB position of write counter 10 of FIG. 1. The MSB signals of write counter 10 are applied on a lead 70 labeled WRS2 and are supplied to one input of a further exclusive OR circuit 72. Output signals from exclusive OR circuit 60 are supplied on a lead 74 to a second input of exclusive OR gate 72. Output signals from exclusive OR gates 66 and 72 are applied, respectively, on leads 76 an 78 to a NAND gate 80 which provides output signals on a lead 82. Lead 82 is used to activate the Count Enable input of write counter 10. Leads 76 and 82 are also supplied as inputs to a NAND gate 84 which has a read output 86. Lead 86 is synonymous with lead 36 of FIG. 1 and is used to activate the Count Enable of the read counter 30.

In FIG. 3, a truth table is presented with the leads as provided in FIG. 2 labeled with both their number and a mnemonic description. In observing the truth table, it will be noted that there are four conditions that the write output will be a logic zero and the remaining time will be a logic one. Likewise, the read output count enable is logic zero in four instances and otherwise is a logic one. Each instance that the write output is a logic zero is when the count of the read counter plus one equals the count of the write counter. From looking at FIG. 3, it will be noted that the first instance of a logic zero in the write output is when both read inputs are logic zero and both write inputs are logic one. Thus, adding one to the write signals causes an overflow and produces a logic zero in these two bit positions. Therefore, they are equal and a logic zero is output to prevent the write counter from catching up with the read counter and, therefore, writing signals into memory in the same section that signals are being read from memory.

The first instance of a logic zero on the read output 86 is when the read signals are advancing towards the write signals and the addition of a logic one to the read signals will alter it from an all zero indication to a binary one indication; thus, a logic zero is provided at output 86. This will keep the read counter from advancing to the same section as the write counter and thereby prevent read operations and write operations from interfering.

OPERATION

Although the operation of the invention has been somewhat described in the introduction as well as in the Detailed Description, it will be summarized herein. As previously indicated, the memory device 40 is being used as an elastic store wherein data is input on lead 46 into memory 40 and at some later point in time is output on lead 48 in accordance with addresses from read counter 30. The reason for the elastic store is that while the frequency of the incoming data indicated by the derived clock on lead 12 is very close to the data clock of the local equipment as indicated by the clock signals on lead 28, they are not synchronized and, thus, allowances must be made internally for these minor differences. Therefore, memory 40 receives data at the rate that it is input and outputs data in accordance with the internal clock of the receiving device indicated by lead 28. Since it is undesirable for the read and write operations to occur simultaneously in the same word position of memory 40, the memory has been defined as having four separate sections and the two most significant bits of each of the write and read counters are used to define these four sections. If the clock 12 is faster than the clock 28, the write counter will advance the addresses so as to close-in on the read addresses. Whenever the write counter is accessing a section of memory immediately adjacent the accessing of the read counter and, there is an indication that the write counter will move to a new section before the read counter moves to a new section, the comparison circuitry or slip control circuitry will act to prevent a count enable from appearing on lead 42 and thus prevent a section address change. (The less significant bits of the address will merely repeat a sequential access of the same section of memory for the next cycle.) The same general actions will occur when the read counter approaches the section of the write counter due to the clock 28 being faster than clock 12. However, in this case, the read enable signal on lead 36 will not occur and the output data on 48 will be a repeat of the information read in the immediately previous time period. While the repeat of an entire section of memory does provide erroneous or at least duplicated output data, this error is easily recognized and continues for only a short period of time. However, if the slip control circuitry were not used, the frequency of the two signals could vary one with respect to the other over a long period of time and cause the output signals on lead 48 to sometimes be currently written signals (or data from lead 46) and sometimes be data which was written a complete cycle previously.

As will be realized, an exclusive OR circuit such as 60 provides a logic one output only when the two inputs on leads 62 and 64 are of opposing logic values. The other two possibilities of logic input signals where they are both the same, such as both logic zeros or logic ones, will provide a logic zero output. The NAND gates, of course, provide a logic zero output only when both inputs are a logic one. A follow-through of the logic circuitry in combination with the truth table will illustrate that a logic zero output is provided on either of the leads only when one of the inputs is the equivalent of one binary number away from the other. A logic zero thus prevents the clock enable, and, thus, the counter is not enabled upon the next received clock signal.

While I have described one embodiment of a slip control circuit for regulating the amount of "slip" between input data and output data on leads 46 and 48, respectively, I wish to be limited only by the scope of the claims appended hereto.

What is claimed is:

1. The electrical circuit method of preventing overlapping sequential read and write operations in the same section of a multisection memory having a minimum of four sections due to nonsynchronized read and write clock pulses, comprising the steps of:

alternately and sequentially reading and writing data into count addressable areas of a multisection memory;

binary digitally counting clock pulses used in actuating read and write operations as they progress from section to section with the portion of the counts, which designate a section, forming the most significant bits of the read and write operation addresses;

logically monitoring the read and write section counts; and advancing the section count portion of the operation address of one of said read and write operations only when the advancement of that operation will not result in both read and write operations occurring in the same section of said multisection memory.

2. Apparatus for preventing overlapping sequential read and write operations in the same section of a multisection memory due to non-synchronized read and write clock pulses comprising, in combination:

multisection memory, including read and write terminals;

means connected to said write terminals for supplying data to be sequentially written into said memory;

write counter means connected to said memory for sequentially addressing said memory for placement of data therein;

read counter means connected to said memory for sequentially addressing said memory for reading data therefrom, said read and write counter means running at nearly identical but unsynchronized rates;

means, connected to at least one of said above named means, for logically monitoring the read and write counter means counts; and means, connected to at least one of said above named means, for advancing the count of one of said read or write counter means only when the advancement of that counter means will not result in both read and write operations occurring in the same section of said multisection memory.

3. Logic circuit apparatus comprising, in combination:

first, second and third exclusive OR gate apparatus, each including first and second input means and each including output means;

first and second NAND gate apparatus, each including first and second input means and each including output means;

means for supplying a signal indicative of a most significant bit (MSB) of a count in a first counter to said first input means of said first exclusive OR gate apparatus;

means for supplying a signal indicative of a most significant bit (MSB) of a count in a second counter to said first input means of said second exclusive OR gate apparatus;

means for supplying a signal indicative of the next most significant bit (NMSB) of the count in the first counter to said second input means of said first exclusive OR gate apparatus and also to said first input means of said third exclusive OR gate apparatus;

means for supplying a signal indicative of the next most significant bit (NMSB) of the count in the second counter to said input means of said third exclusive OR gate apparatus;

means connecting said output means of said first exclusive OR gate apparatus to said second input means of said second exclusive OR gate apparatus for supplying logic signals thereto;

means connecting said output means of said third exclusive OR gate apparatus to aid first input means of each of said first and said second NAND gate apparatus for supplying logic signals thereto;

means connecting said output means of said second exclusive OR gate apparatus to said second input means of said first NAND gate apparatus for supplying logic signals thereto;

means connecting said output means of said first NAND gate apparatus to said second input means of said second NAND gate apparatus for supplying logic signals thereto;

first apparatus output means connected to said output means of said first NAND gate apparatus for supplying logic signals of a given logic value only when a signal indicative of a binary logic "1" added to the signal from the MSB and NMSB of said second counter creates a sum signal equal to the signal received from the MSB and NMSB of said first counter; and second apparatus output means connected to said output means of said second NAND gate apparatus for supplying logic signals of a given logic value only when a signal indicative of a binary logic "1" added to the signal from the MSB and NMSB of said first counter creates a sum signal equal to the signal received from the MSB and NMSB of said second counter.

4. Count detection apparatus for comparing the counts of two non-synchronous sequentially advancing counters of the same modulus and providing an indication when the count of one counter is approaching the count of the other counter and further providing an indication as to the counter that is advancing on the other comprising, in combination:

means for supplying first and second non-synchronous count signals;

first counter means, connected to said first named means, for providing a digital signal indicative of said first count signal upon enablement by a first further signal;

second counter means, connected to said first named means, for providing a digital signal indicative of said second count signal upon enablement by a second further signal;

first comparison means connected to said first and second counter means for enabling said first counter means with the first further signal only when the count of said second counter means is more than a predetermined number of digits greater than the count of said first counter means; and second comparison means connected to said first and second counter means for enabling said second counter means with the second further signal only when the count of said first counter means is more than a predetermined number of digits greater than the count of said second counter means.

* * * * *

UNITED STATES PATENT AND TRADEMARK OFFICE
CERTIFICATE OF CORRECTION

PATENT NO. : 4,175,287
DATED : 11/20/79
INVENTOR(S) : James L. Fuhrman

It is certified that error appears in the above-identified patent and that said Letters Patent are hereby corrected as shown below:

Column 1, line 15, delete "expensive" and substitute therefor --extensive--.

Column 2, line 46, delete "an" and substitute therefor --and--.

Column 5, line 30, delete "aid" and substitute therefor --said--.

Signed and Sealed this

Seventeenth Day of June 1980

[SEAL]

Attest:

SIDNEY A. DIAMOND

Attesting Officer     Commissioner of Patents and Trademarks